Jan. 3, 1933.                R. W. STRADLING                1,892,909
                              WATERING DEVICE
                            Filed Oct. 9, 1929
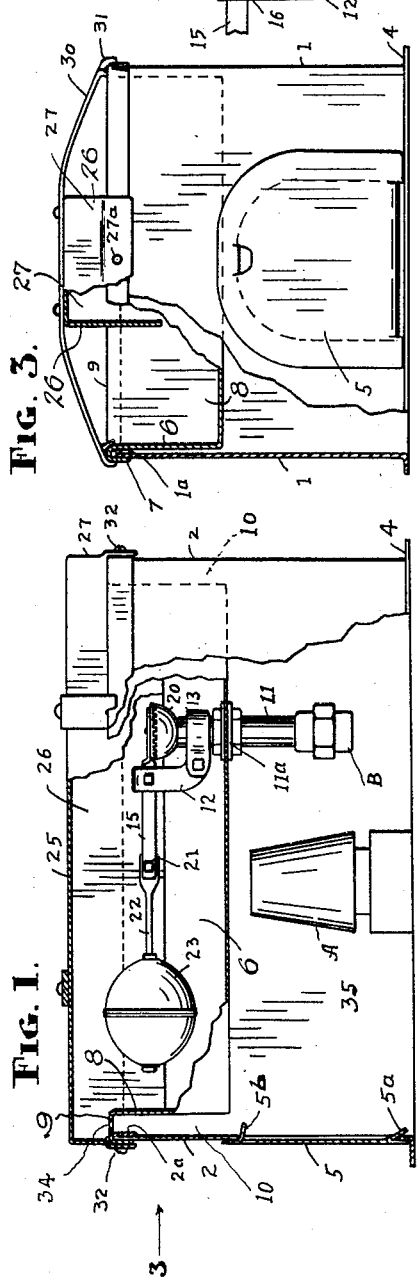
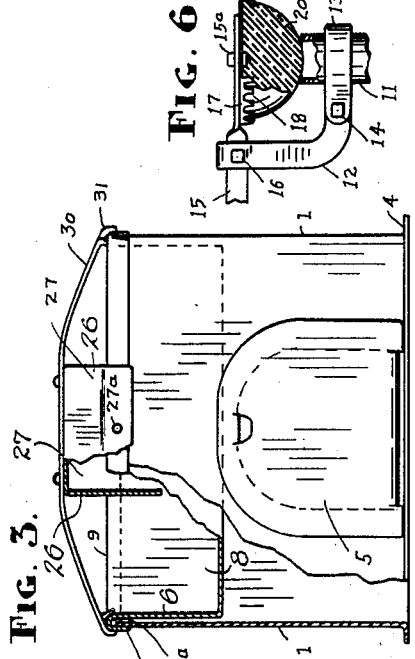
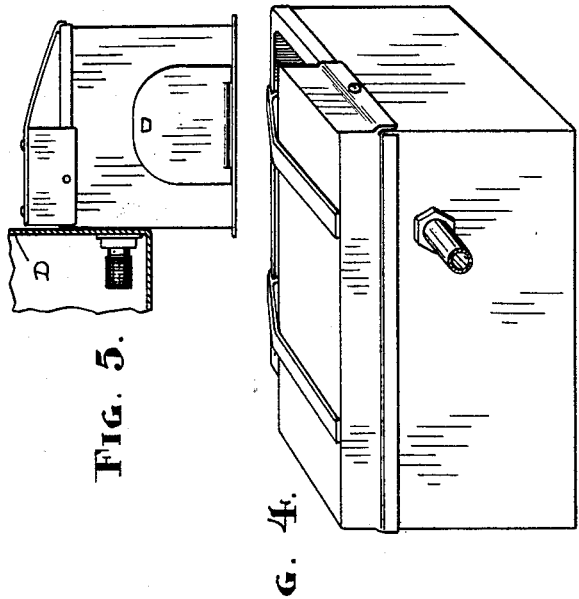
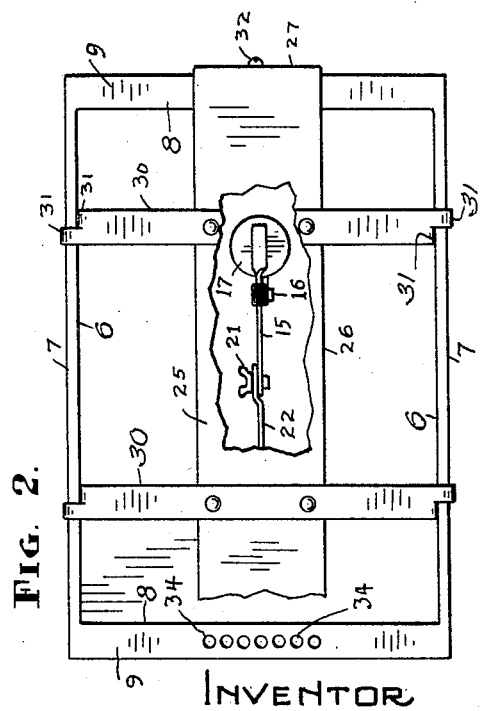
INVENTOR
ROBERT W. STRADLING
ATTORNEY.

Patented Jan. 3, 1933

1,892,909

UNITED STATES PATENT OFFICE

ROBERT W. STRADLING, OF EATON, INDIANA

WATERING DEVICE

Application filed October 9, 1929. Serial No. 398,434.

This invention relates to improvements in live-stock watering devices, of that class embodying a water retaining receptacle suitably supported on a casing within which a heating unit is retained, and which receptacle is provided with a float controlled valve for automatically controlling the flow of water.

Objects of the present invention are to provide a device of the kind described whereby a suitable temperature of the water may be had during the seasons of severe cold, and whereby the valve device parts are properly shielded, and at the same time ample drinking space is afforded. Further and more specific purposes are to provide an apparatus which in its entirety is durable and efficient, economical of manufacture, and is capable of being easily installed, and of being kept in a clean, sanitary condition.

The objects of my invention are accomplished by and the invention is embodied in the new construction, combination and arrangement of parts described in the following specification and illustrated in the accompanying drawing.

The several parts of the invention are identified by suitable characters of reference in the different views in which—

Figure 1 is a side view of my improved watering-device, a portion of the side wall of the casing, a portion of the side wall of the receptacle, and a portion of the side wall of the canopy, being broken away.

Figure 2 is a top plan view of Figure 1, an end portion of the canopy being broken away.

Figure 3 is an end view taken in the direction of arrow 3 in Figure 1.

Figure 4 is a modification showing my invention embodied in a form of construction wherein the water supply is introduced at the side of the receptacle, and which said construction is suitable for being installed in connection with, and to receive its water supply from, a reservoir or ordinary stock tank.

Figure 5 is an end view of the device shown in Figure 4, as the same appears when installed.

Figure 6 is an enlarged detached detail view of the float controlled valve.

For a watering device of size and capacity for general and convenient use of horses, cattle, hogs, and sheep, the water-retaining receptacle is about eighteen inches by twenty-four inches in plan, and about six inches in depth. A casing which is adapted to have a heater device A retained therein, comprises the sheet metal side walls 1 and 1, and the end walls 2 and 2. The upper edges of the said walls are bent over to constitute stiffener beads 1a and 2a respectively, as shown in Figure 1 and Figure 3, and the lower edge of each of the walls is provided with a suitable flange 4. The said flanges 4 are adapted to rest on or below the ground level or upon a suitable substructure of such height as may be desired. A door 5 has an inturned leg 5a to engage the inner side of the lower edges of an opening (shown by the dotted lines) in the casing, and a resilient inclined tongue 5b to removably engage the upper edge of said opening. This simply constructed and easily manufactured door affords access whereby the heating unit may be placed in or removed from position.

The said water-retaining receptacle, rectangular in plan, as shown in Figure 2, has its side walls 6 and 6 provided with lips 7 which rest upon the beads 1a of the side walls of the casing, and the end walls 8 and 8 are provided with horizontal flanges 9 and 9 which rest upon the beads 2a of the end walls of the casing. The end walls 8 and 8 of the receptacle are spaced from the end walls of the casing thereby providing heat spaces 10 and 10, which will presently be referred to.

Passed through an aperture in the bottom of the receptacle, and located equidistant between the walls thereof is an inlet pipe 11 which is secured by the lock nuts and packing 11a. A union joint B affords connection for the water supply pipe line (not shown) which is brought up from underneath the ground surface. A water flow control device which is simple of construction, and easy to install and which is adaptable for inlet pipes of various sizes, and which also is easily accessible for any purpose, and which renders practicable the employment of certain elements presently to be described, comprises a metal bar 12 having the integrally formed annular wrist clamp 13 which is adapted to be secured to the pipe 11 by a clamp screw 14. The upper portion of the bar 12 is bent upon itself thereby providing a support and guideway for a lever 15 which is pivotally supported on a cross pin 16. On the underside of the short end of the said lever bar 15 a sheet metal disk 17 having a downwardly disposed annular flange provided with the teeth 18 is secured by a bolt 15a. A semi-hemispherical head 20 made of sponge rubber, is secured to the underside of the disk 17 by pressing the teeth 18 inwardly, their points piercing and becoming imbedded in the rubber. Whereas the rubber element is thus held securely, it is capable of being easily replaced when necessary. This rubber head, when lowered, becomes seated at effective closing engagement with the mouth of the inlet pipe. Retained adjustably on the long portion of the bar 15, by set screw 21, is a stem 22, to which a float ball 23 is secured.

A device constructed as above described, is capable of being easily and correctly installed by simply lowering same to, and securing it by the clamp wrist 13, to the pipe. Free access to all of the parts, for the purposes of adjustments, renewals or repairs is easily had.

A sheet metal duct-like structure which I designate as a canopy, has the top 25, the sides 26, and the end plates 27. Centrally of the lower portion of each of the end plates is a screw hole 27a. The said canopy is of length to span the receptacle, its end plates 27 and holes 27a coming to repose in registration with the vertical portions, and screw holes of the end flanges of the receptacle. Transverse stay bars 30, spaced as shown in the drawing, and which are secured to the top of the canopy, have their ends bifurcated, the prongs 31 thereof being adapted to engage the lips 7 and 7 of the sides of the receptacle. By these bars the canopy is caused to assume correct position when disposed in place, and by the insertion and tightening of the metal screws 32 at each end thereof it is held securely in place. It will be observed that the sides 26 of the canopy are of such depth that the plane of their bottom edges is below the plane of the top of the receptacle.

In the portions of the flanges of the receptacle which are underneath the said canopy, openings 34 are provided, whose functions are to permit of the passing of the warm air from the chamber 35, and the heat spaces 10, into the space within the said canopy and above the surface of water, indicated by the dotted line in Figure 1.

By the foregoing construction and combination of parts a very slight degree of heat is sufficient to prevent freezing of the water. The space beneath the canopy being sealed by the water (whose level is at all times above the plane of the bottom edges of the canopy) there is practically no heat loss, and therefore a relatively slight degree of temperature from the heating unit A is required. The jointures between the canopy structures and the receptacle, and between the casing wall and the door, being not air tight, there is sufficient air circulation for the heating unit.

A watering device may be constructed in accordance with my invention at a relatively small cost, and it is capable of being easily erected by a person of only ordinary skill. The float valve device is shielded from the elements, and is protected against liability to injury or derangement. There are ample drinking spaces available at both sides of the receptacle. For the purposes of readjustment or repairs to the float valve parts, or for thorough cleansing of the receptacle, the canopy, and also the float valve assembly may be easily removed from and replaced in position.

The invention in modified form as shown in Figure 4 and in Figure 5 is arranged to receive the water supply through the side thereof and it is intended for a watering-device of a size suitable to receive its water supply from an ordinary water reservoir or tank D. In this form of structure the float controlled valve, and the canopy are located at one side of the receptacle, thereby affording ample area for drinking space.

I am aware that minor changes may be made in the invention within the scope thereof as same is defined in the appended claims without departing from the spirit of the invention or sacrificing any of its advantages.

What I claim as my invention, and desire to secure by Letters Patent, is—

1. A watering device of the kind described, comprising a flanged water receptacle having perforations in the flanges of its ends, a supply pipe, a float controlled valve device in said receptacle for automatically controlling the flow of water through said pipe to compensate for the amount of water drawn from said receptacle, a canopy structure to cover the valve device and to span said receptacle, the bottom edges of whose sides are below the plane of the top of the receptacle, and a casing to support said receptacle and the walls thereof being spaced from the ends of the receptacle to provide flues to communicate through the aforesaid perforations, with the portions of the water receptacle that are covered by the canopy.

2. In a device of the kind described, the combination with a flanged water receptacle having perforations in the flanges of its ends, a canopy to span the said receptacle, the bottom edges of whose sides are below the plane of the top of the receptacle, and a casing to support the said receptacle, the walls thereof being spaced from the ends of the receptacle thereby providing flues to communicate through the aforesaid perforations, with the portion of the water receptacle that is covered by the canopy.

ROBERT W. STRADLING.